Feb. 23, 1960 J. R. BEETZ 2,925,758
APPARATUS FOR FORMING CARTONS OR CONTAINERS
Filed April 3, 1957 3 Sheets-Sheet 1
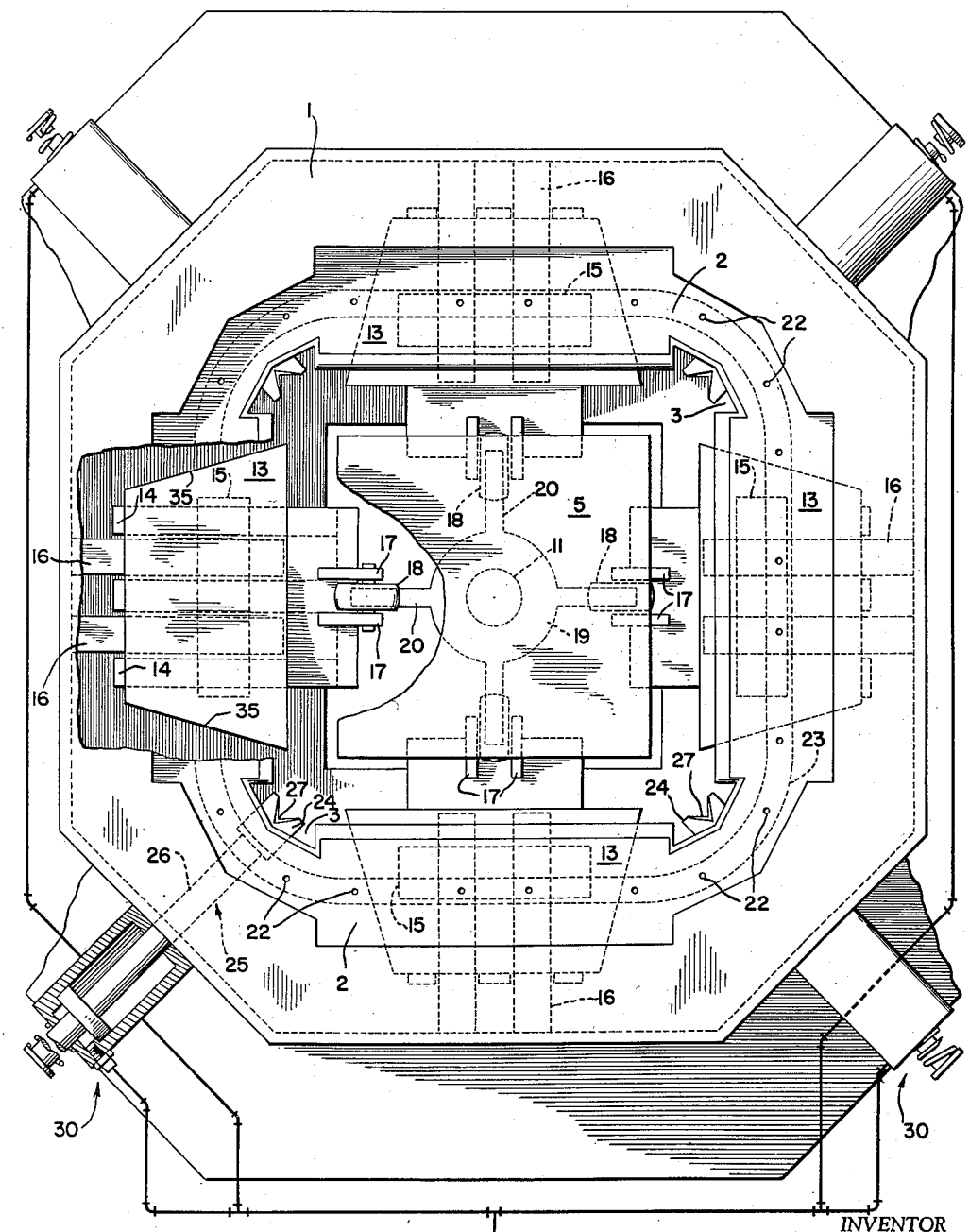
FIG.1
INVENTOR
JACQUES R. BEETZ
BY 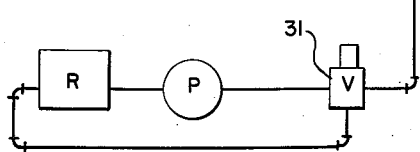
ATTORNEY Feb. 23, 1960 J. R. BEETZ 2,925,758
APPARATUS FOR FORMING CARTONS OR CONTAINERS
Filed April 3, 1957 3 Sheets-Sheet 2
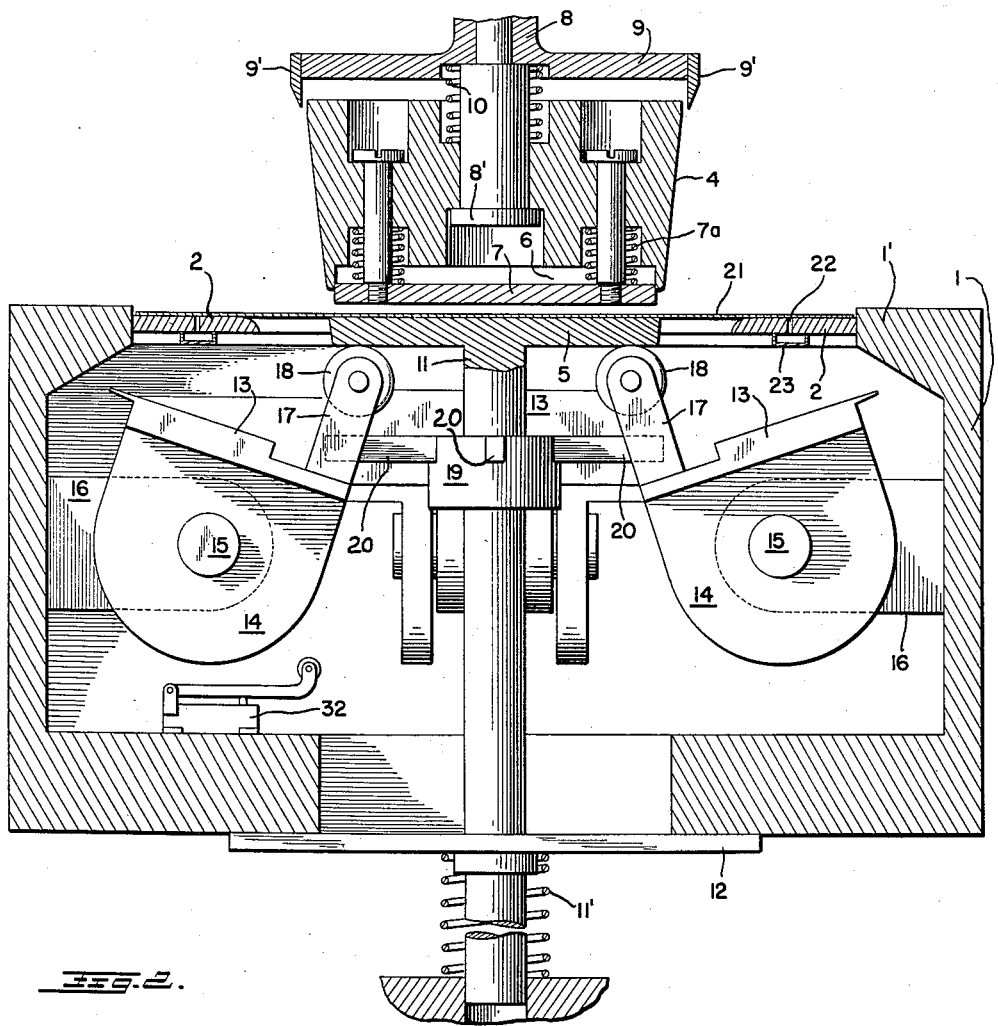
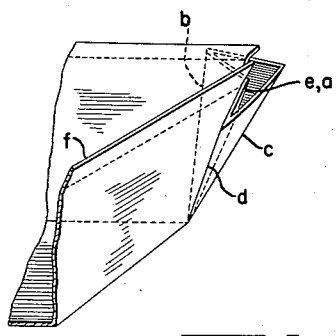
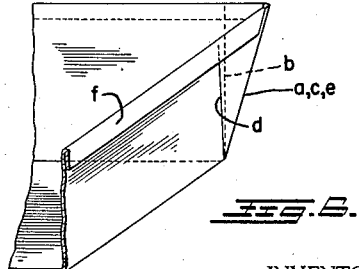
INVENTOR
JACQUES R. BEETZ
BY *James E. Toomey*
ATTORNEY Feb. 23, 1960　　　　J. R. BEETZ　　　　2,925,758
APPARATUS FOR FORMING CARTONS OR CONTAINERS
Filed April 3, 1957　　　　　　　　　　3 Sheets-Sheet 3
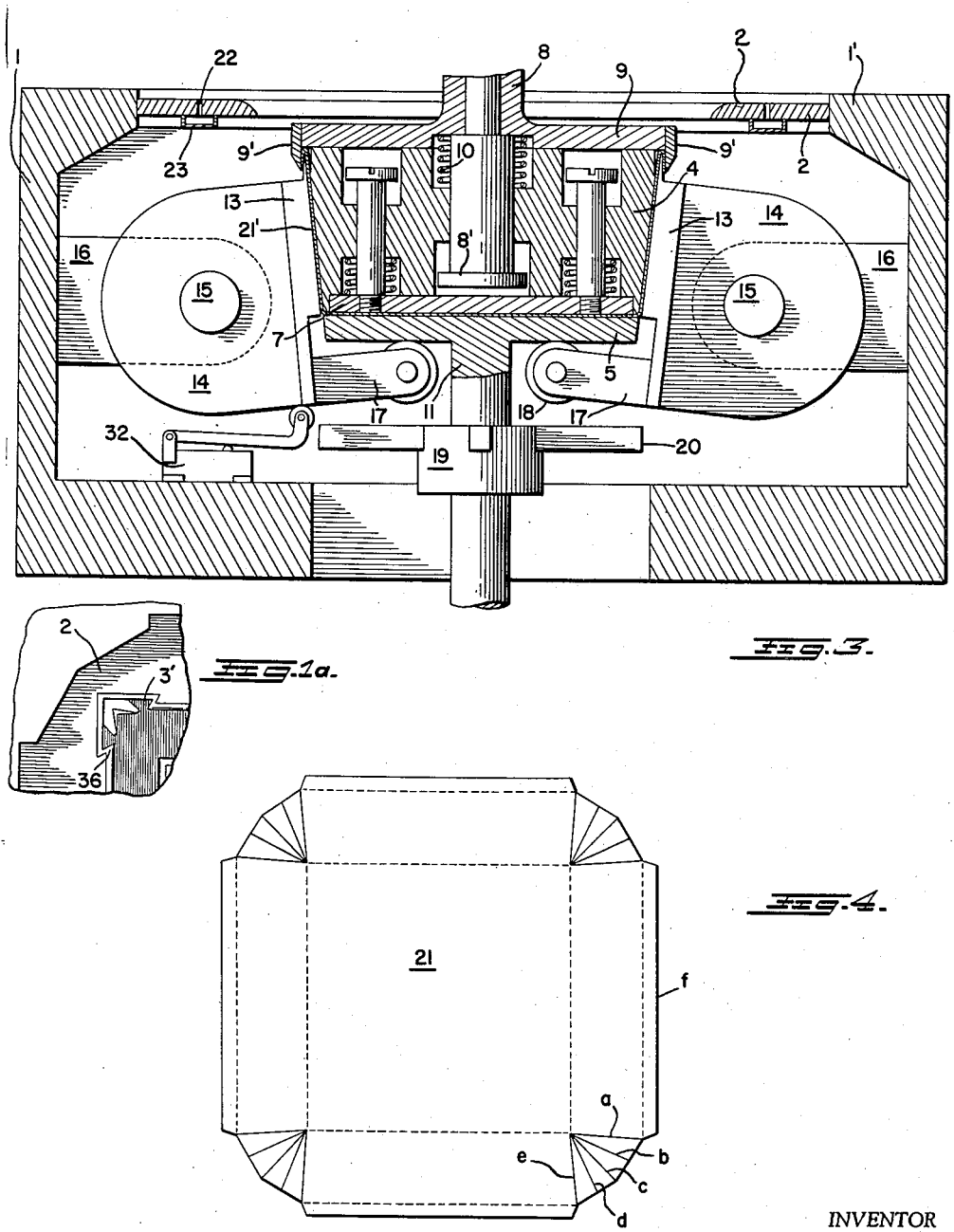
INVENTOR
JACQUES R. BEETZ
BY James E. Toomey
ATTORNEY

United States Patent Office 2,925,758
Patented Feb. 23, 1960

2,925,758

APPARATUS FOR FORMING CARTONS OR CONTAINERS

Jacques Robert Beetz, Brussels, Belgium, assignor to Alium, S.A., societe anonyme, Brussels, Belgium, a company of Belgium Application April 3, 1957, Serial No. 650,434

Claims priority, application Luxembourg June 25, 1956

12 Claims. (Cl. 93—51)

This invention relates to the manufacture of containers. More particularly, the invention is concerned with providing an apparatus for forming merchandizable cartons or containers of materials such as paper, plastics, metal foils or various combinations thereof, and preferably aluminum foil or foil-paper laminates of sufficient gauge as to be self sustaining.

Many machines are known and in use which will operate to form sheet metal, heavy paper or the like into containers of the type shown in U.S. Patent 927,538 to Hothersall, dated July 13, 1909. However, difficulties in securing proper formation of corners and flanges have been encountered, where the container is formed of thin gauge materials such as metal foil, foil-paper laminates and the like. Consequently, the resultant products are not as satisfactory as might be desired. Among the undesirable features in such products are weaknesses, unattractive appearance, and improper folds.

Corrective measures for these conditions in manufacture have proven expensive thus contributing to higher fabricating costs. This, in turn, has limited the uses and markets for such containers.

The principal reason for the aforementioned difficulties resides in the fact that previous machines either stamp the blank materials and hence produce poor corner definition or the blanks are so fabricated as to cause drawing of the metal. When the blanks used are sheet metal of relatively thick gauge as compared with metal foil or paper, the resultant deformation of the metal is not critical. When the blank is comprised of metal foil or paper of relatively thin gauge, any drawing of the material is completely undesirable since it usually results either in actual tearing or scoring of the blank and a production of weaknesses in the finished product.

Accordingly, an object of the invention is to provide an apparatus adapted in a unique fashion to form thin walled containers.

Another object of the invention is to produce an apparatus for forming containers wherein the blank from which the container is made is controllably folded rather than stamped or drawn.

Still another object of the invention is to provide an apparatus for making containers of thin gauge metal such as aluminum foil, wherein novel means are provided for foldably forming portions of the container walls.

A further object of the invention is to provide an apparatus which will satisfactorily form containers of thin gauge material such as aluminum foil in a single operating cycle.

An additional object of the invention is to provide an apparatus which will form strong serviceable containers from light metal foils or foil laminates.

Still a further object of the invention is to provide a container forming machine which is of relatively simple design and inexpensive to operate.

These and other objects of the invention, inherent therein, but not specifically referred to may be accomplished by providing a suitably shaped reciprocating punch in combination with a suitable matrix and means for holding a blank against the matrix. A suitable die having a central aperture considerably larger than the punch is also used for initiating and partially folding the blank. A plurality of reciprocating flat surfaced and punch actuated folders are also employed for engaging and folding the partially folded blank. Also provided are means for engaging the partially folded corners of the container and for thereafter folding these corners against the completed sides in such a manner as to completely lock the sides and reinforce the folded corners. All of the above operations are performed without drawing the blank.

If desired, suitable means may also be provided for flanging and providing additional reinforcement of the walls as well as to preclude the presence of sharp edges in the finished product.

The mentioned objects and other features and advantages of the invention will become apparent from the ensuing detailed description of the invention with reference to the accompanying drawings, which show an apparatus whereby the corners of the container are folded back symmetrically along two adjacent faces of the intersecting side and ends of the container wherein;

Figure 1 is a partial plan view with parts broken away showing a punch and matrix and the critical operating elements of the novel container forming apparatus.

Figure 1a is a fragmental plan view showing an alternative form of a detail of Figure 1;

Figure 2 is a partial side sectional view showing the essential operating elements in a position of rest;

Figure 3 is a view similar to Figure 2 but showing the apparatus in actuated condition prior to completion of its operating cycle, certain parts being removed for clarity;

Figure 4 is a fragmentary plan view of a prepared blank which is formed by the apparatus shown in Figures 1 to 3 into a suitable container;

Figure 5 is a partial view of a corner of a container being formed according to the invention, the degree of formation corresponding somewhat to that produced by the apparatus in the position shown in Figure 3, and Figure 6 is a view similar to Figure 5 but showing a corner completely formed and the peripheral edges of a side and end wall flanged.

The apparatus shown in Figures 1 through 3 is adapted to form the container shown in Figure 5 from a blank as shown, for example, in Figure 4, which has been cut to the required outline with the main lines of bending or folding also having been impressed at the corners and at those areas where folding is to be effected. The corner impressions or score lines are advantageously designated $a$, $b$, $c$, $d$, $e$, and the manner and direction of bending of the corner areas is indicated in Figures 5 and 6. The scoring of certain of the blanks can be performed simultaneously with the folding of other prescored blanks if desired by incorporating a scoring device in the instant apparatus. Or the scoring may be done on a completely different machine. In any case, the scoring means forms no part of the present invention, since in some instances it may be entirely feasible not having blanks scored prior to their insertion in the apparatus herein disclosed.

The matrix comprises a hollow generally rectangular body part or parts 1 provided with a die plate 2 which is placed slightly lower than the upper face 1′ of the body 1 and is in the form of an open frame. The inner face of the die plate 2 has an outline generally similar to the polygonal outline of the box to be formed. For example, it can be square or rectangular. It is also preferably considerably larger than the box. The die plate 2 has at its corners slots 3, the shape of which corresponds to that to be given to the corners of the box during initial bending of the blank.

A generally rectangular or square sloping-sided punch 4, adapted to cooperate with a suitable blank holder 5, is driven by any suitable means to give it an axial reciprocating motion. The punch 4 is provided with a lower interior cavity 6 also generally rectangular or square in which is positioned a complementary configured ejector 7, biased downwardly by suitable springs 7a. The ejector acts, as will be described, to release a finally formed container from the punch.

A motion transmitting shaft 8 is also used for operating the punch 4. This shaft in turn is provided with an integrally formed and generally rectangular or square plate 9. Plate 9 is so constructed that it will have limited axial movement with respect to the punch body 4. This is accomplished through the use of a stop means 8' and a spring 10 located intermediate plate 9 and the main body of punch 4. Spring 10 is stronger than the combined strength of springs 7a and acts against both the punch body 4 and the plate 9 to bias the punch vertically downwardly for a purpose to be described subsequently. Positioned centrally in the aperture surrounded by die plate 2 is a blank support or holder 5 having a shape corresponding to that of the box to be formed and integral with the shaft 11. Shaft 11 extends vertically downward and is guided to move in a true vertical motion by any suitable guide means, not shown. A suitable spring 11' urges the blank support 5 normally upwardly into the position shown in the Figure 2, this position being determined by suitable stop means, for example, a flange 12 integral with the shaft 11 and cooperating with the base of the body of the matrix 1.

Corresponding in number to the number of sides of the container and positioned within the matrix and die plate 2 are a series of pivotally movable plates 13. The surface of each plate has an area which corresponds to almost the entire surface of each lateral face or wall of the container. These plates are mounted on brackets 16 projecting from the matrix 1 by suitable pins 15 with pins 15 in turn being connected to fork-like ears 14 secured to plates 13. These plates 13 are provided with integral bifurcated ears 17. Bifurcated ears 17 are provided at their terminal ends with rollers 18 which project inwardly beneath the blank holder 5 as shown in Figure 2. The shaft 11 is further provided with a collar 19 having a series of radially extending fingers 20. As a consequence, the movement of the plates 13 is produced both by the vertical movement of shaft 11 through contact between fingers 20 and rollers 18 as indicated in Figure 3 as well as by contact of these rollers with the underside of blank holder 5 in a manner to be hereinafter described.

Also positioned beneath the die plate 2 and as may be clearly seen in Figure 1 are a plurality of corner pressing elements 25, one for each corner of a polygonal sided container formed by the apparatus of the instant invention. Each of these elements includes a horizontally reciprocable rod 26 mounted in suitable guide means (not shown) as is conventional, and an enlarged head 24. The head member 24 is generally a rectangular block so disposed that its longer dimension is vertical and has an inner face 27 of generally V-shaped configuration and adapted to engage the corners formed by the sloping walls of the punch member 4. Thus, the V-shaped face 27 of the head members 24 will compress any material at the corners of the punch 4 against the flat sloping walls of the punch.

Suitable means, such as a hydraulic operated, spring biased motor 30 under the control of solenoid operated valve 31 may be used to operate, i.e., reciprocate the corner folding elements 25 in timed relation with respect to the operation of the punch 4. The solenoid would in turn be operated by a spring biased switch 32 which is closed by movement of the ear 17 thereagainst as shown in Figures 2 and 3.

Having generally described the components, it may be seen that operation of the apparatus is as follows:

A blank 21 is placed on the die plate 2, the whole device is then in the position as shown in Figures 1 and 2. The positioning of the blank may be facilitated by suction through holes 22 provided in the die plate and connected by a manifold 23 to any source of vacuum.

The punch 4 begins its downward stroke and upon coming into contact with the blank 21 is supported by the blank holder 5. At this time, springs 7a are compressed, being weaker than the spring 11' which is, in turn, weaker than the spring 10. The ejector plate 7 withdraws into recess 6 and the punch 4 then carries the blank holder 5 with it in its downward movement at which time the bottom of blank holder 5 engages roller 18 on the ear 17 of all of the folding members causing plates 13 to be pivoted inwardly. The blank 21 is partially bent, its sides having slid freely on the edges of the die plate 2, which are preferably inclined—upwards and outwards as seen in Figures 2 and 3. The blank then approaches the position 21' of Figure 3. The edges 35 of the die plates are also of a sloping or tapered configuration to eliminate any interference between the plates 13 and head members 24.

At the end of the down stroke of the punch the plates 13 come into contact with the sides of the blank, which they press against the punch. This contact between plates 13 and the punch body takes place practically simultaneously over the entire surface of all of the plates so that the material of the blank is not subjected to any perceptible friction or undesirable folding or lamination action. In their final position, the plates immobilize the blank holder 5 and the punch body 4.

The downward movement of the shaft 8 continues for a slight amount, however, during which time the spring 10 is compressed slightly. During the time the blank holder 5 and the punch 4 are immobilized, the corner forming members 25 are actuated by closing of switch 32 as it contacts the ears 17 on one of the plates 13. Members 24 then press against the corners of the container already partially bent by their passage through the slots 3 and the die plate 2, as shown in Figure 5, so as to flatten them against the punch and thus symmetrically fold the triangular flaps against the outside faces of adjacent side and end walls of the container as shown in Figure 6 in the example illustrated.

It will be seen that the plates 13 are, in fact, of trapezoidal shape, narrowing towards the top, in order to prevent their acting on the corner folds of the partially folded blank against which ultimately the corner folding members 25 act. The action of these members 25 is very rapid and takes place during the first part of the period the blank holder and punch are immobilized. During the rest of this time, the chamfered edges 9', integral with the plate 9 and the shaft 8, fold back the edges f of the container so as partially to cover and reinforce the corners of the box by these folded back edges or flanges.

It is to be noted that if the formation of edges f is not required, the flange forming element 9' may be omitted. In any event, the flanges f are not critical in constructing the container because once folded the corner folds will remain in place, particularly where a material such as metal foil, paper-foil laminates and other materials of like characteristics are being utilized.

The container having been completely folded and flanged, the punch 4 begins its return stroke and the blank holder 5 follows the movement under the action of the spring 11'. At this time, the rollers 18 on the ears 17 of the plates 13 are contacted by the fingers 20 attached to shaft 11 and urged upwardly by the action of spring 11' against the plate 12 associated with the bottom of shaft 11. Thus, the plates 13 pivot towards their original position. Finally, the punch becomes disengaged from the blank holder 5 along with the formed box, which is then released by the ejector 7 under the action of the springs 7a.

It will be appreciated that various changes may be made in the described apparatus all of which are within the spirit and scope of the invention as defined by the appended claims.

Thus, the corner folding elements 25, instead of being actuated by the means illustrated, can e.g. be driven by a pneumatic motor to which compressed air is being periodically supplied under the control of a valve operated by the lower end of shaft 11 during the lower portion of the reciprocal movement thereof.

Furthermore, as illustrated in Figure 1a, the corner cut-outs or corner slots of the die plate 2 can be designed as shown in 3', so as to define acute-angled horns 36 at the adjacent ends of the inner sides of the die plate for initiating the folding of the corners of the blank during the downward movement thereof, the depth and the contour of the cut-outs being of sufficiently large size to practically avoid sliding contact between the blank and the said contour, except at the said horns, thereby avoiding any danger of undesirable distortions of the corner portions of the blank.

What is claimed is:

1. An apparatus for the manufacture of thin wall polygonal containers comprising a matrix including a resiliently supported blank holder the shape of which corresponds to that of the bottom of the finished container, a punch, said punch being movable vertically and having a shape corresponding to the interior of the container to be formed, said matrix including a die plate provided with a central opening having a shape approximating the outline of the container to be formed but larger than the exterior dimensions thereof, said punch being movable into said open die plate to initiate folding of the edges of the blank which define the container walls, wall folding plates mounted on said matrix beneath said die plate so as to press the partially folded edges of said blank against said punch and stopping the movement of the punch relative to the wall folding plates, said die plate having cut-outs at its corners for initially forming the corners of a container being produced, said cut-outs acting to partially bend the corners of the blank during passage thereof through said die plate, and means on said matrix movable transversely to the punch for finally folding the partially bent corners when the movement of the punch has been stopped by the wall folding plates.

2. A device for folding boxes comprising a matrix including a fixed frame on which the blank is to be placed, a punch having a shape corresponding to the interior of the box, means for imparting reciprocating movement to the punch perpendicularly to the blank supported on said frame, and a movable blank support including resilient return means and having a shape corresponding to the bottom of the box and cooperating with the punch for being displaced thereby during part of the movement thereof against the action of the return means which return the blank support to a position substantially in the plane of said frame; said frame having an opening larger than the finished box and being defined by sides which are parallel to those of the box, and outwardly extending cut outs which allow passage therethrough of the portions of the blank which are intended to form the corners to initiate folding; plates arranged within the matrix to stop the movement of the punch relative to said plates after it moves a distance greater than the height of the box for pressing the side walls of the latter against the punch leaving free only the local zones of the side walls on which the corners are to be folded down, and members movable transversely to the punch for folding down the corners and pressing them against the side walls while the latter are pressed against the punch by said plates.

3. An apparatus for the manufacture of containers comprising a matrix, die means on said matrix for receiving a container blank, punch means movable into and out of said die means to partially fold the blank, means disposed beneath said die means for completing the folding of the blank and including a plurality of wall folding plates arranged in the path of movement of the punch for simultaneously folding portions of the blank against said punch means after movement thereof through said die means; said die means including a die plate provided with a central opening having a shape approximating the outline of the container to be formed but larger than the exterior dimensions thereof, corner cut outs for imparting initial folding of the corner portions of the blank, said cut outs having a contour which is longer than that of the said corner portions.

4. The apparatus of claim 3 wherein said cut outs define acute angled horns at the adjacent ends of the inner sides of said die plate.

5. An apparatus for folding containers comprising a matrix, a die plate mounted on said matrix for initially accommodating blanks to be folded, a movable blank holder normally disposed at most at the height of the die plate, punch means having a periphery the same as that of the interior of the container and normally disposed above said die plate, said die plate having an opening which is larger than the finished container and is defined by sides which are parallel to those of the box, said sides being separated from each other by outwardly extending cut outs which allow the passage of the portions of the blank which are intended to form the corners by folding, means for moving said punch means toward said blank holder to clamp the blank therebetween and displace them perpendicularly to the plane of the die plate while carrying the blank therethrough a distance greater than the height of the finished container to produce a folding of the side walls of the box, wall folding plates disposed in said matrix to stop movement of said punch and perform the final folding of the container walls, said plates leaving the upper end zones of the side walls of the container free on which the corners are to be folded, and means for finally folding down the corners against the side walls while the latter are pressed against the punch by said plates.

6. An apparatus for forming a container from a blank comprising a matrix, a vertically movable punch positioned over said matrix and movable therein, said matrix including a die plate; said die plate having a central opening which is larger than said punch through which said punch passes and also having corner cut outs extending outwardly of the opening in the die plate and a contour longer than that of the corner portions of the blank and defining at the adjacent ends of the inner sides of the die plate, plate portions having an angle not greater than a right angle, said die plate acting to partially fold a blank carried downwardly therethrough by said punch; means comprising a blank holder movable in response to contact between said punch and holder during movement of the punch through said die plate, means for moving the punch, blank holder and blank through the opening in the die plate to thereby initiate folding of the side walls forming portions of the blank by the sides of said die plate and initiate folding of the corners forming portions of the blank by the cut outs of the die plate, means including a plurality of folding plates for stopping the movement of the punch relative to said plates and simultaneously pressing the side walls of the box against the punch over substantially their entire surface and leaving free only the upper end zones of the side walls on which the corners are to be folded down, means movable transversely to the punch acting after contact of said folding plates with said punch to compress and lock the partially folded corners of said blank in the spaces left between said plates to lock said blank edges against said punch, and means acting to release the finished container from said punch upon return of the punch to its position of rest.

7. The apparatus of claim 6 wherein said folding plates are rockable, and means for rocking said plates simultaneously and actuated by movement of the punch.

8. Apparatus as defined in claim 6 wherein said container releasing means comprises a plate carried by said punch, said plate being movable with respect thereto upon return of said punch to its normal position of rest.

9. An apparatus as defined in claim 6 wherein said folding plates are trapezoidal with their long base substantially coinciding with the short base of the corresponding side of the punch to permit contact of said corner folding means with said blank.

10. An apparatus for forming containers comprising die means for receiving a container blank, punch means movable into and out of said die means to partially fold the blank, means disposed beneath said die means for completing the folding of the blank and including a plurality of rockable wall folding plates, and means for rocking said plates simultaneously to fold portions of the blank against said punch means after movement thereof through said die means, said die means comprising a die plate provided with a central opening having a shape approximating the outline of the container to be formed but larger than the exterior dimensions thereof, said die plate further including corner cut-outs for imparting initial folding of the corner portions of the blank, said cutouts being designed so as to define acute-angled horns at the adjacent ends of the inner sides of said die plate and having a contour which is longer than that of the said corner portions.

11. An apparatus for the manufacture of containers having a generally polygonal outline comprising a punch having a form corresponding to the interior of the container, a blank support, a frame having an opening larger than the exterior dimensions of a finished container and defined by sides parallel to those of the punch and separated by outwardly extending cutouts for the passage of the blank portions for forming the corners of the container, means for moving said punch, blank support and blank through the opening in the frame a distance greater than the height of the container for initiating folding portions of the blank towards said punch during its movement through the frame opening, a plurality of plates arranged beneath the frame for simultaneously folding the side walls and finally pressing them against the punch while stopping the movement of the punch relative to said plates and leaving free only the spaces for folding the corners, and folding means for pressing the corners against the punch in the spaces left free between the plates while the side walls are being pressed against the punch by said plates.

12. A method for the manufacture of containers or packing boxes having a polygonal outline by folding a blank, in which the portion of the blank corresponding to the bottom of the box to be formed is held between a bearing surface and a punch, and the assembly is displaced perpendicularly to the plane of said bottom while carrying along the blank through a frame to produce a folding of the side walls of the box with the corners thereof being finally folded against adjacent side walls, characterized in that the blank is initially placed on a die plate having an opening which is larger than the finished box and is defined by sides being parallel to that of the box and separated from each other by outwardly extending cutouts which allow the passage of the portions of the blank which are intended to form the corners by folding, and further characterized in that the bottom of the box and the members between which it is held are then displaced over a distance greater than the height of the box, so as to initiate folding during this displacement, and that at the end of said displacement the side walls of the box are pressed by plates against the punch which stop the movement of the punch relative to these plates and leave only free the local zones of the side walls on which the corners are to be folded down, and then effecting the folding of the corners against the side walls while the latter are pressed against the punch by said plates.

References Cited in the file of this patent

UNITED STATES PATENTS

| 581,116 | Hitchcock | Apr. 20, 1897 |
| 1,000,991 | Comings | Aug. 22, 1911 |
| 1,154,969 | Burnham | Sept. 28, 1915 |
| 1,646,563 | Sonneborn | Oct. 25, 1927 |
| 1,715,585 | Woodworth | June 4, 1929 |
| 2,120,902 | Moore | June 14, 1938 |
| 2,132,859 | Mednick et al. | Oct. 11, 1938 |
| 2,292,403 | Peters | Aug. 11, 1942 |
| 2,722,166 | Keller | Nov. 1, 1955 |